United States Patent [19]

Kampe et al.

[11] Patent Number: 4,472,460

[45] Date of Patent: Sep. 18, 1984

[54] GAS DIFFUSION ELECTRODE

[75] Inventors: Dennis J. Kampe, Parma; Michael B. Dowell, Hudson, both of Ohio

[73] Assignee: Union Carbide Corporation, Danbury, Conn.

[21] Appl. No.: 393,389

[22] Filed: Jun. 29, 1982

[51] Int. Cl.$^3$ .......................... B05D 5/12; B05D 3/02
[52] U.S. Cl. .................................... 427/113; 427/228; 429/42; 429/44
[58] Field of Search ...................... 427/113, 228, 249; 429/212, 213, 214, 215, 42, 44, 45

[56] References Cited

U.S. PATENT DOCUMENTS

| | | | |
|---|---|---|---|
| 3,026,214 | 3/1962 | Boyland et al. | 427/228 |
| 3,307,977 | 3/1967 | Kordesch | 136/122 |
| 3,342,627 | 9/1967 | Paxton et al. | 427/113 |
| 3,405,010 | 10/1968 | Kordesch et al. | 136/120 |

*Primary Examiner*—Norman Morgenstern
*Assistant Examiner*—Kenneth E. Jaconetty
*Attorney, Agent, or Firm*—John R. Doherty

[57] ABSTRACT

An improved gas diffusion electrode is produced by coating the carbon particles of carbon black substantially uniformly with a sugar char prior to the activation of the carbon.

1 Claim, No Drawings

GAS DIFFUSION ELECTRODE

The invention relates to gas diffusion electrode and particularly to a method for producing an improved gas diffusion electrode.

Gas diffusion electrodes such as air cathodes are used in electrochemical cells and typically use activated carbon. U.S. Pat. No. 3,307,977 describes a process for producing an air cathode in which the activated carbon includes an aluminum-cobalt spinel. The preferred spinel is in the form of $CoOAl_2O_3$ which is prepared from a solution of cobaltous nitrate and aluminum nitrate which are present in stoichiometric quantities to form $CoOAl_2O_3$. The spinel forming solution is applied to the carbon black particles before activation of the carbon. The improvement made in the U.S. Pat. No. 3,405,010 is the addition of ruthenium chloride to the reactants used to produce the spinel.

The instant invention is an improvement over the prior art and relates to the aforementioned patents.

In practice, the solution of the three reactants is applied to the selected carbon black and an elevated temperature of about 800° C. in a steam atmosphere is maintained in order to decompose the reactants, thereby forming the spinel on the surfaces of the carbon black particles, and to activate the carbon black by creating a pore structure by oxidation of the carbon by the steam.

The instant invention substantially shortens the time needed to activate the carbon and increases the yield.

The instant invention in its broadest embodiment relates to a process for producing a gas diffusion electrode comprising the steps of forming an activated carbon, and features the improvement of substantially uniformly coating carbon black particles with a liquid which when pyrolyzed forms a substantially continuous coating of electrically conductive carbon char on the particles, thereafter, pyrolyzing the coated particles to form the char coated particles, and subsequently activating to form the activated carbon.

Preferably, the liquid is a solution or melt of a material selected from the group consisting of sugars, phenolics, epoxies, and combinations thereof.

More preferably a sugar solution is used.

Illustrative, nonlimiting examples of the practice of the invention are set out below. Numerous other examples can readily be evolved in the light of the guiding principles and teachings contained herein. The examples given herein are intended merely to illustrate the invention and not in any sense to limit the manner in which the invention can be practiced. The parts and percentages recited herein and all through this specification, unless specifically stated otherwise, refer to parts by weight and percentages by weight.

EXAMPLE 1

Five runs were made in order to compare the instant invention with prior art processes and to distinguish the significance of the practice of the invention from ineffective but related operations.

For Run A, carbon black was treated with an aluminum-cobalt spinel solution including ruthenium chloride and activated in accordance with U.S. Pat. No. 3,307,977.

For Run B, 9.80 kilograms of the same carbon black was heat treated to 1000° C. in a nitrogen atmosphere, and then charged into a blade mixer. Six and eighty hundredths kilograms of glucose solution was sprayed through a nozzle at the top of the mixer onto the carbon black at the rate of 0.45 kilogram per minute. The glucose solution was composed of glucose and deionized water and had a density of 1.26 grams per cubic centimeter. This resulted in the sugar and carbon black mixing in a ratio of 1:2.

The carbon black and glucose solution was mixed together for an additional 20 minutes at ambient temperature and the mixture had a consistency comparable to wet sand. The mixture was spread onto trays and dried in air overnight at a temperature of 110° C. The dried material was then heat treated in a nitrogen atmosphere to 1000° C. to pyrolyze the glucose to yield approximately 20% by weight sugar char. This treated carbon black was then doped with the spinel solution used in Run A and activated in the same manner as Run A.

For Run C, the steps of Run B were repeated on a sample of the heat treated carbon, except that prior to spraying the glucose solution onto the carbon black, 3.79 liters of deionized water was sprayed onto the carbon black in order to wet the carbon black. This resulted in the mixture being paste-like rather than having the consistency of wet sand when it was spread into trays for drying. The drying step as well as the spinel treating and activation step of Run B was carried out.

For Run D, 4.54 kilograms of the carbon black used in Run A was heat treated to 1000° C. The calcined carbon black was charged into a stainless steel mixer and mixed for five minutes while a glucose solution was added. The glucose solution comprised 2.27 kilograms of glucose and 4.08 kilograms of deionized water. The ratio of sugar to carbon black was 1:2. Seven and twenty-six hundredths kilograms of deionized water was then added at the rate of 0.454 kilograms per minute and the mixture had a smooth, paste-like consistency. The paste-like material was dried, calcined to 1000° C. and doped with spinel as in Run B and activated.

An analysis of the activated carbon for Runs B, C, and D revealed that Runs B and C only had partial coatings of sugar on the carbon black; whereas, the process of Run D showed a substantially uniform coating of each particle with sugar char.

Basically, if the amount of sugar in solution is selected to be sufficient to coat each particle, the presence of pure sugar char is evidence that the particles have not been substantially uniformly coated in accordance with the invention. In addition, the char coated paricles are more hydrophobic than the uncoated or partially coated particles so that the value of the penetration coefficient which is a measure of hydrophobicity would be lower.

Table 1 shows a comparison between the activation time required for the runs along with the penetration coefficient for each of the activated carbons. The Washburn equation was used to determine the value of the penetration coefficient, $l^2/t$, from measured data obtained in accordance with the tests described in "The Influence of Ultimate Composition Upon the Wettability of Carbon Blacks," by M. L. Studelbaker and C. W. Snow, J. Phys. Chem. 59, p. 973 (1955).

$$l^2 = \frac{\gamma \cdot \cos\theta \cdot r \cdot t}{2\eta}$$

where:

l = length of flow in time t, $\eta$ = viscosity,
$\gamma$ = surface tension of the liquid,
$r$ = radius of capillary tube, and
$\theta$ = contact angle.

The surface area measurements were the criterion for the extent of the activation treatment.

TABLE 1

| Run | Activation Time (Hr) | Yield (%) | Penetration Coefficient $\times 10^3$ cm$^2$/sec | Surface Area BET m$^2$/g |
|---|---|---|---|---|
| A | 6 | 17 | 1.2 | 510 |
| B | 12 | 21 | 3.4 | 535 |
| C | 6 | 39 | 1.2 | 440 |
| D | 4 | 50 | 0.4 | 510 |

Run D required substantially less time for the activation and provided the maximum yield with respect to the prior art reported by Run A and the less effective coating operations reported by Runs B and C. Furthermore, the activated carbon from Run D possessed a very low penetration coefficient. This is an important factor because an improved hydrophobic activated carbon is desirable for most electrochemical cells and particularly for an air cell which uses a thin porous gas diffusion electrode which must contain and stabilize a liquid-gas interface in the active layer.

Therefore, these runs show that a substantial improvement can be obtained if one coats each of the particles in the carbon black and that care must be taken to achieve the coating in order to obtain a substantial improvement.

EXAMPLE 2

Additional runs were made and measurements were made to determine the electrical conductivity of the activated carbons. A high level of electrical conductivity is desirable for an activated carbon in an air cathode because it minimizes the electrical power losses due to internal resistances. In addition, it is particularly important for the gas diffusion electrode because these electrodes are porous and usually held together using insulating binders such as polytetrafluoroethylene so that the volume available for the conducting phase is relatively small.

Runs E and F were carried out using a precursor carbon black different from the one used in Example 1 and Runs G and H were carried out with a carbon black the same as the one used in Example 1. Runs E and G were carried out using the same process as used in Run A and Runs F and H were carried out using the same process as used in Run D.

Table 2 shows the activation time and measured electrical conductivity for Runs E, F, G, and H.

TABLE 2

| Run | Activation Time (hr) | Conductivity mho/cm |
|---|---|---|
| E | 7 | 0.65 |
| F | 4 | 1.15 |
| G | 6 | 0.60 |
| H | 2 | 1.50 |

The activated carbons made in accordance with the invention, Runs F and H, showed substantial improvements over the runs according to the prior art.

We wish it to be understood that we do not desire to be limited to the exact details of construction shown and desribed, for obvious modifications will occur to a person skilled in the art.

Having thus described the invention, what we claim as new and desire to be secured by Letters Patent, is as follows:

1. In a process for producing a gas diffusion electrode wherein carbon black is treated with a spinel and activated at high temperatures, the improvement which comprises substantially uniformly coating carbon black particles with a solution of a material selected from the group consisting of sugars, phenolics, epoxies and combinations thereof, which material when pyrolyzed forms a substantially continuous coating of electrically conductive carbon char on said particles, the amount of said solution used to coat said particles being such that the coated particles will have a penetration coefficient of less than about $1.2 \times 10^3$ cm$^2$/sec., thereafter pyrolyzing said coated particles to form the char coated particles and subsequently activating to form the activated carbon.

* * * * *